United States Patent [19]

Champeau et al.

[11] 4,445,405

[45] May 1, 1984

[54] LATHES WITH CENTRAL HEADSTOCK

[75] Inventors: Marcel Champeau, Niort; André Tabutin, La Celle-Saint-Cloud, both of France

[73] Assignee: Ramo S.A., France

[21] Appl. No.: 327,086

[22] Filed: Dec. 3, 1981

[30] Foreign Application Priority Data

Dec. 11, 1980 [FR] France ................................ 80 26336

[51] Int. Cl.$^3$ ............................................ B23B 15/00
[52] U.S. Cl. ............................................ 82/2.5; 82/3
[58] Field of Search ................................ 82/2.7, 2.5, 3; 414/745; 29/568, 563

[56] References Cited

U.S. PATENT DOCUMENTS

| 1,503,111 | 7/1924 | Brown . | |
|---|---|---|---|
| 1,587,261 | 6/1926 | White . | |
| 3,129,506 | 4/1964 | Hain . | |
| 3,575,302 | 4/1971 | Cafolla . | |
| 3,741,048 | 6/1973 | Peuterbaugh . | |
| 3,827,581 | 8/1974 | Inui . | |
| 3,851,991 | 12/1974 | Walker | 82/2.7 |
| 4,013,176 | 3/1977 | Lohneis et al. | 82/2.7 |
| 4,026,171 | 5/1977 | Kubacki et al. . | |

FOREIGN PATENT DOCUMENTS

| 1227266 | 4/1960 | France . |
|---|---|---|
| 1314746 | 12/1963 | France . |
| 2125385 | 9/1972 | France . |
| 2220345 | 10/1974 | France . |
| 2448954 | 9/1980 | France . |
| 586094 | 3/1977 | Switzerland . |
| 1062515 | 3/1967 | United Kingdom . |

OTHER PUBLICATIONS

Metal Working Production, vol. 106, May 30, 1982.

*Primary Examiner*—W. D. Bray
*Attorney, Agent, or Firm*—Lewis H. Eslinger

[57] ABSTRACT

Improvement to lathes with central headstock used for machining internally and/or externally a workpiece, and comprising a bed supporting a headstock on which two workpiece-clamping chucks are mounted for pivoting on the same spindle, said chucks being fitted symmetrically on two opposite faces of the headstock.

The means for transferring the workpieces from one chuck to the other are pivotally mounted on said headstock, said means being used in combination with workpiece- injecting and ejecting means situated coaxially to the spindle and opposite the two chucks of the headstock, respectively.

The invention finds an application in lathes with central headstock used for machining short workpieces.

8 Claims, 22 Drawing Figures

LATHES WITH CENTRAL HEADSTOCK

The present invention relates to an improvement to lathes with a central headstock.

For machining, and in particular milling simultaneously the two ends of a workpiece, the workpiece is held in a clamped position in a rotating spindle, mounted in a headstock placed in the middle of the bed of a lathe.

This method can be used with relatively long workpieces which can spread over the entire length of the spindle going through the headstock. With short pieces however, it is impossible to use the device mentioned hereinabove for machining the workpiece internally and/or externally, and it then becomes necessary to use a headstock on which two chucks are rotatably mounted for clamping the workpieces, the chucks being fitted symmetrically on two opposite faces of the headstock.

This particular arrangement makes it possible to machine in one operation the internal and/or external parts of two workpieces mounted on the two chucks. But, to carry out two successive machining operations on the same workpiece, it is necessary to perform a large number of manipulations to transfer the workpiece from one of the chucks to the other and to load or release the workpiece.

It is the main object of the present invention to overcome this disadvantage by proposing means pivotally mounted on the headstock for transferring the workpieces from one chuck to the other chuck, the transfer means being used in combination with two other means, one for injecting and one for ejecting the workpieces, which means are situated coaxially to the spindle and opposite the two chucks of the headstock, respectively.

It is possible with the device according to the invention to carry out several machining operations on a relatively short workpiece and to transfer it from one chuck to the other, in a very short time.

The invention will be more readily understood by reading the following description with reference to the accompanying drawings in which:

FIG. 8 is a half-view of an axial cross-section of the means provided for controlling the workpiece in the loosened position.

Figure 1:
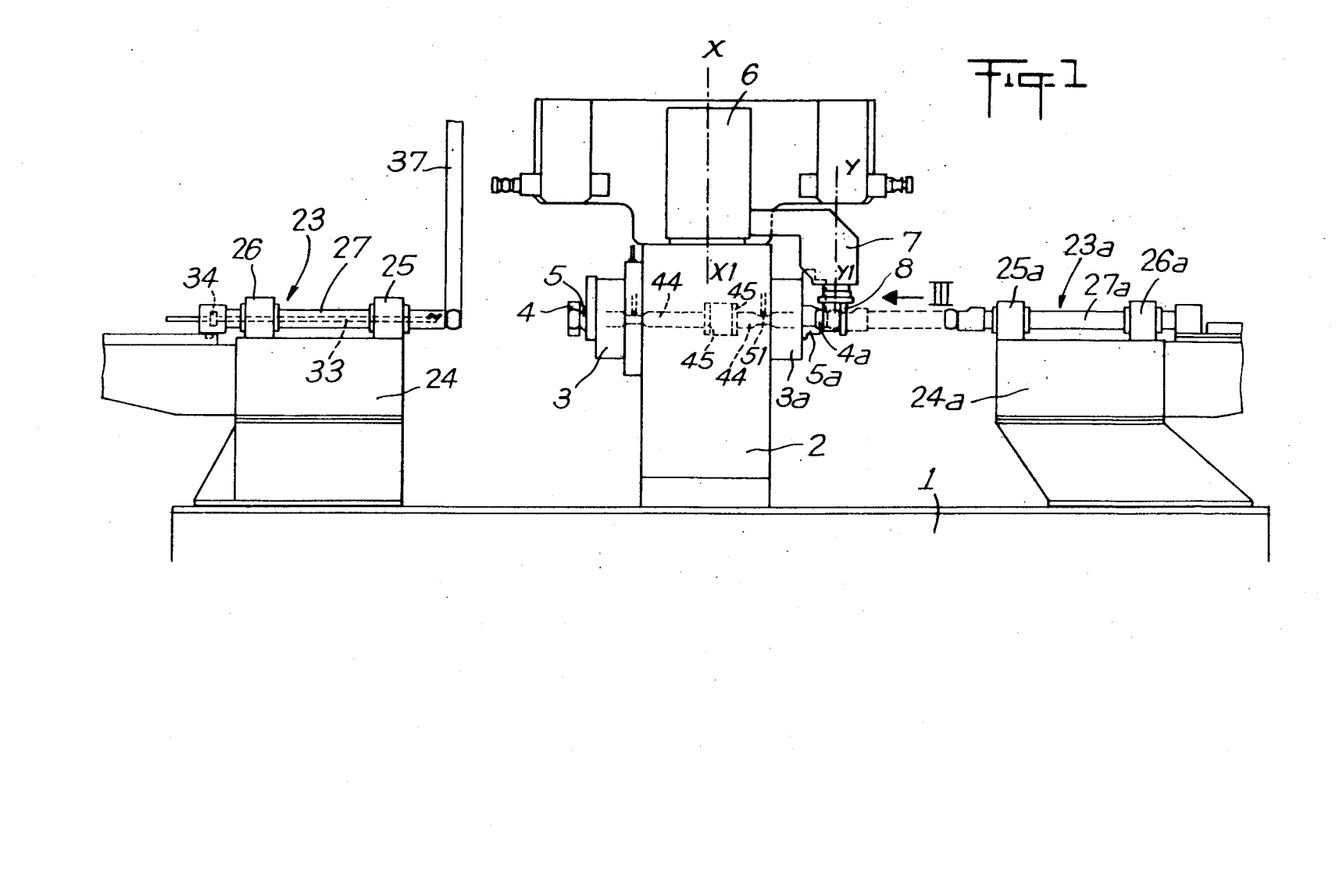
FIG. 1 is an elevational view of a lathe with an improved central headstock according to the invention.
Figure 2A:
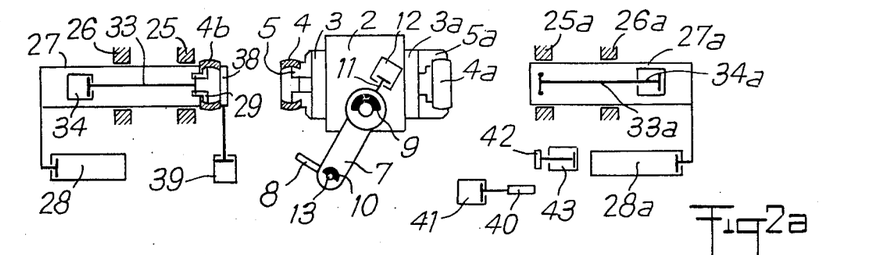
FIGS. 2a to 2n are plan views of the lathe with a central headstock showing different feeding operations.

FIGS. 1 and 2a show a lathe with central headstock which is composed of a frame 1 equipped in its centre with a headstock 2 on which two chucks 3, 3a are mounted for rotation on the same spindle said chucks being provided for clamping the workpieces and being placed symmetrically on two opposite faces of the headstock. According to the illustrated embodiment, one of the chucks, 3, holds an annular workpiece 4 in position with its internal jaws 5 and the other chuck 3a holds an identical workpiece 4a in position with its external jaws 5a.

Transfer means are mounted on the upper face of the headstock 2, for pivoting about a vertical axis $XX_1$, which means comprise a cylindrical part 6 integral with a transfer arm 7 in which a clamping device 8 is mounted for pivoting about an axis $YY_1$, said device being provided for gripping the workpiece 4, 4a. The pivoting movement of the transfer arm 7 is obtained by means of a rotary hydraulic jack 9 and the pivoting movement of the clamping device 8 is obtained by means of a rotary hydraulic jack 10 (FIG. 2a). Locking means 11 actuated by a jack 12 are provided for locking the arm 7.

At the lower end of the spindle 13 supporting the clamping device 8, there is provided a supporting member 14 (FIGS. 3 and 4) on which are pivotally mounted axles 15, 15a integral with jaws 16, 16a of the clamping member, and gear wheels 17, 17a mounted for rotation in the supporting member 14. The gear wheels 17, 17a mesh with a toothed rack 18 which is integral with a rod 19 at the end of which is fitted a piston 20 of a jack. The piston is mounted for sliding inside a cylinder 21 and subjected to the action of elastic members 22 or rubber washers resting against the piston and against one of the bottoms of the cylinder 21. The jaws of the clamping member are held in a clamping position by the elastic member 22 and in an open position under the action of the fluid acting on the piston 20 on the side opposite the elastic members and which, by moving the toothed rack 18, move also the gear wheels 17, 17a and actuate the jaws 16, 16a.

A workpiece injection member 23 and a workpiece ejection member 23a are provided on either side of the headstock 2, along a horizontal axis and co-axially to the spindle of the headstock on either side of the latter, each member comprising a support 24, 24a resting on the frame 1 of the lathe and two bearings 25, 26 and 25a, 26a (FIGS. 1,2) in which are slidably mounted a tubular element 27, 27a actuated by a jack 28, 28a.

At the end of the tubular element 27, 27a which faces the chucks 3, 3a, there is provided a muff 63 (FIGS. 5,6) mounted for sliding in the element and provided on the inside with three fingers 29 mounted for pivoting about axles 30 integral with the muff 63. On the side opposite the axle 30 the fingers 29 are extended by a boss 31 which is engaged in a groove 32 provided at the end of a rod 33, 33a mounted for sliding inside the tubular element 27, 27a and which is controlled at its other end by a jack 34, 34a.

Figure 5:
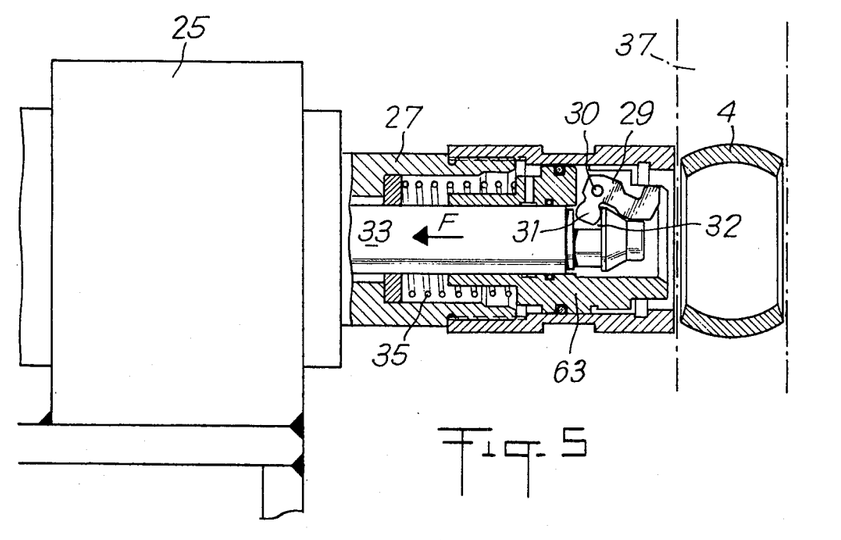
FIG. 5 is an elevational view of an axial cross-section of the end of one of the injection means with the fingers in the retracted position.
Figure 6:
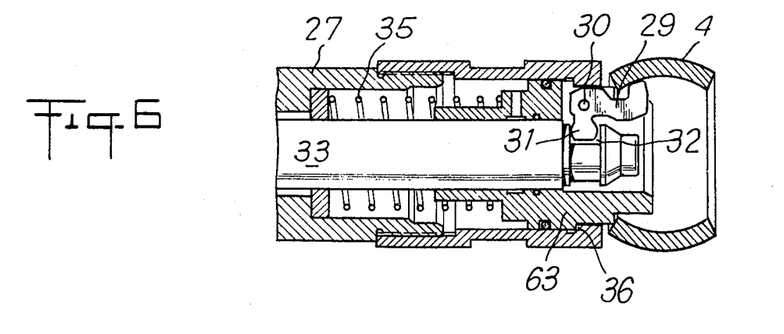
FIG. 6 is a similar view of a cross-section of the end of the injection means with the fingers being extended to hold the workpiece.

The muff 63 is subjected to the action of a spring 35 which tends to hold the muff 63 in abutment against a shoulder 36 of the tubular element 27 when the fingers 29 are in the open position.

The rod 33 by moving in the direction of arrow F (FIG. 5), carries with it in the same direction, the muff 63 which is integral with the fingers 29. The fingers are joined to the rod 33, so that they retract inside the tubular element 27 while the muff 63 compresses the spring 35.

When the rod 33 moves in the opposite direction to arrow F, the muff 63 abuts the shoulder 36 and engages the inside of the workpiece 4 (FIG. 6), the fingers being still in the retracted position. The rod 33, by continuing to move in the direction opposite to arrow F, causes the fingers 29 to pivot about the axles 30 and to engage the inside of the workpiece 4 against the inner wall thereof. Opposite the injection member 23 there is provided a workpiece-supplying gullet 37, the workpieces being brought directly opposite the fingers 29 of the tubular element 27 (FIG. 1). The workpiece 4 to be loaded is held in position on the side opposite the fingers 29 by means of an abutment 38 integral with the piston rod of a jack 39 which actuates the abutment.

A similar abutment 40 actuated by a jack 41 is situated between the ejection member 23a and a gullet (not shown in the drawing) for discharging the workpieces, the abutment cooperating with a chips-removing member 42 actuated by a jack 43.

Figure 2B:
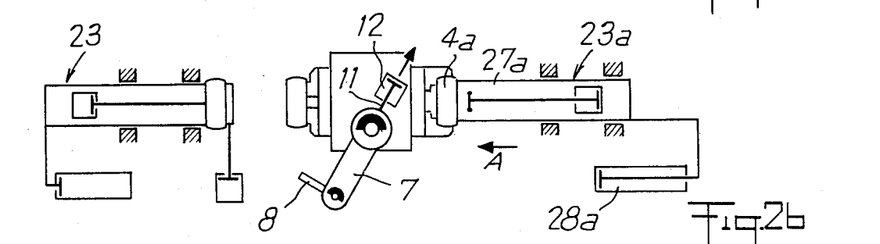

The device according to the invention operates as follows:

FIG. 2a shows the device when the workpieces 4 and 4a, mounted on the chucks 3, 3a, are in the clamped position and at end of machining, the loading arm 7 being held in the rest position by the locking member 11 and a workpiece 4b being held by the fingers 29 on the injection member 23 in resting contact against the abutment 38. The ejection member 23a is in the retracted position, and the clamp 8 of the transfer arm is in the open position. In the position illustrated in FIG. 2b, the transfer arm 7 is released by actuating the jack 12, thus setting back the locking member 11. The tubular element 27 of the ejection member is actuated in the direction of arrow A by the jack 28a to engage the head of the tubular element in the workpiece 4a.

Figure 2C:
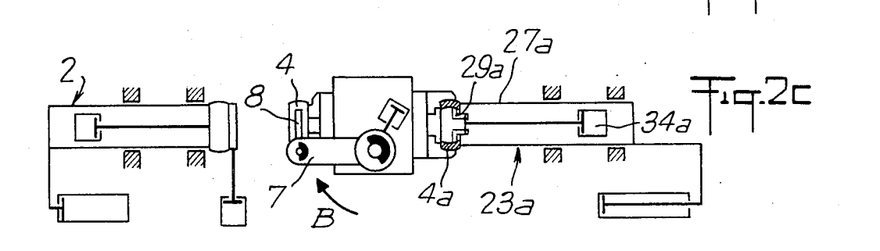

In FIG. 2c, the fingers 29a of the ejection member 23a are spread out under the action of the jack 34a and reach the inside of the workpiece 4a in the clamping position. Moreover, the jack 9 is actuated in such a way that the transfer arm 7 pivots according to arrow B and comes into engagement on the workpiece 4, the clamp 8 being in the open position.

Figure 2D:
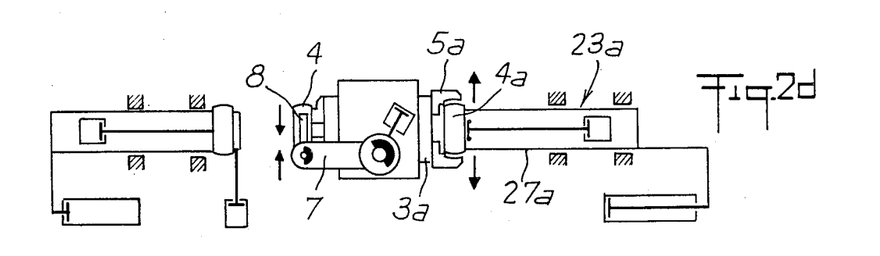
Figure 2E:
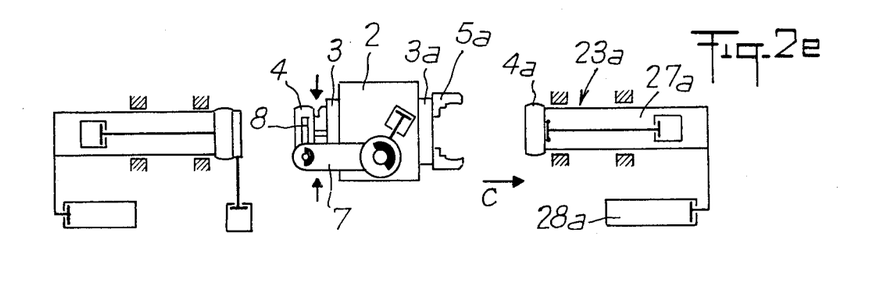
Figure 3:
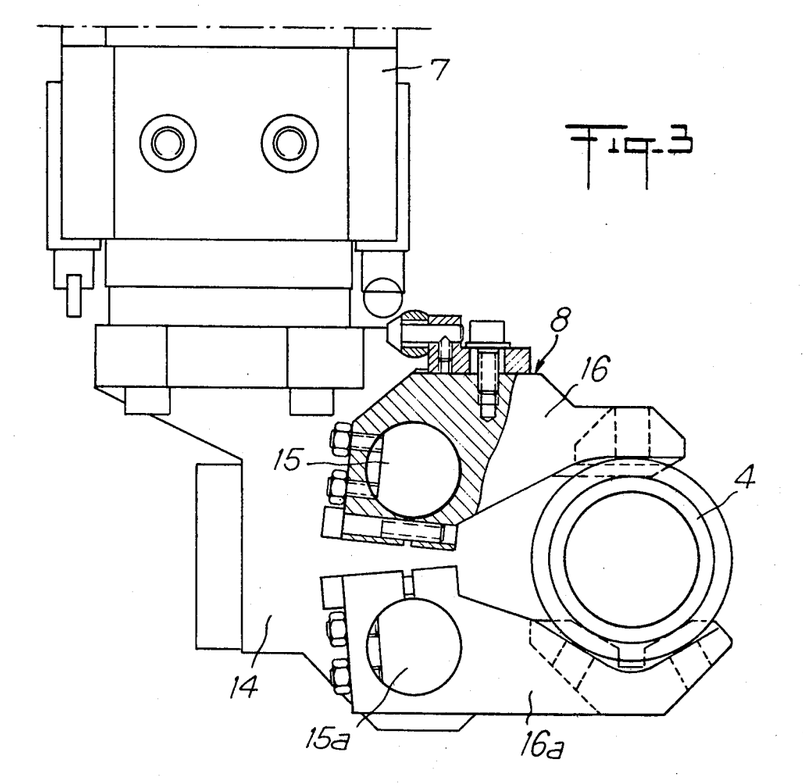
FIG. 3 is an elevational view along arrow III of FIG. 1 of the clamping member of the transfer means.
Figure 4:
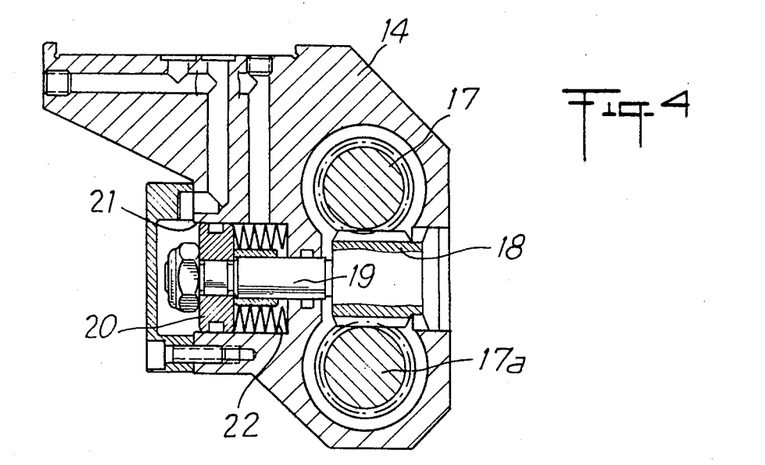
FIG. 4 is a cross-sectional view of the means provided for actuating the jaws of the clamping member.

In FIG. 2d, the clamp 8 is in the clamping position, the jaws 16, 16a being subjected to the action of elastic members 22 and to the hydraulic pressure, both of which ensure the clamping of the jaws 16, 16a on the workpiece 4 (FIGS. 3 and 4). Simultaneously, the jaws 5a of the chuck 3a are loosened to release the workpiece 4a which is mounted on the end of the tubular element 27a of the ejection member 23a. In FIG. 2e, the jaws 5 of the chuck 3 are loosened to release the workpiece 4 which is held by the clamp 8 of the transfer arm 7. Simultaneously, the jack 28a of the ejection member 23a is actuated so as to move the tubular element 27a in the direction of arrow C to remove the workpiece 4a mounted at the end of the said element.

Figure 2F:
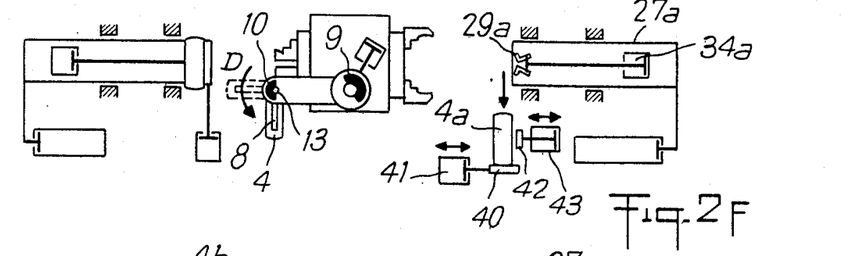

In FIG. 2f, the jack 10 of the arm 7 is actuated to cause the pivoting movement of the clamp 8 about the axle 13, to carry the workpiece 4 in an intermediate position shown in broken line, and then in a final position, turning towards the right in the direction of arrow D.

Simultaneously, the jack 34a is actuated to retract the fingers 29a and release the workpiece 4a which comes in abutting contact with the abutment 40 and the chips-removing member is moved to-and-fro. The abutment 40 then returns to a set-back position thereby releasing the workpiece 4a which is discharged into a gullet (not shown in the drawing).

Figure 2G:
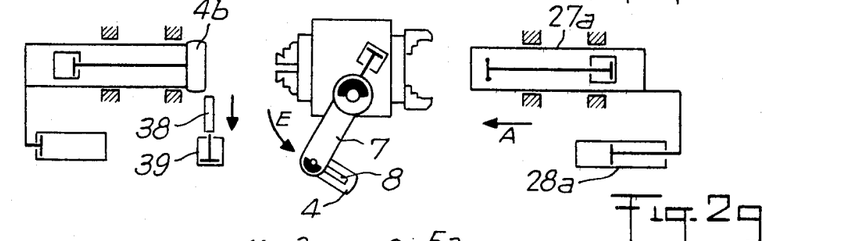

During the operations illustrated in FIG. 2g, the abutment 38 actuated by the jack 39 moves into a set-back position to allow the passage of the workpiece 4b and the jack 28a is actuated to bring the tubular element 27a in an intermediate position. Simultaneously, the jack 9 actuates the arm 7 which pivots in the direction of arrow E to reach an intermediate position in the direction of the chuck 3a.

Figure 2H:
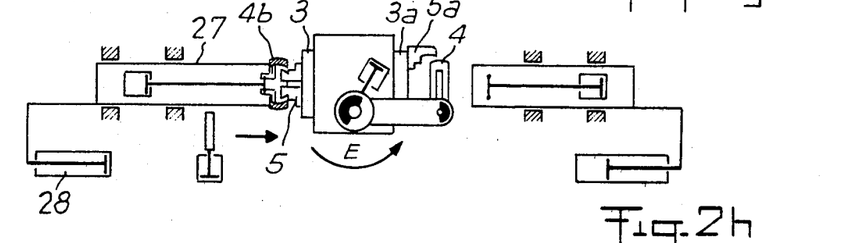

In FIG. 2h, the arm 7 continues on its stroke in the direction of arrow E and brings the workpiece 4 between the released jaws 5a of the chuck 3a, whereas the jack 27 causes the tubular element 28 to move towards the right, carrying at its end the workpiece 4b which is fitted on the jaws 5 of the chuck 3.

Figure 2I:
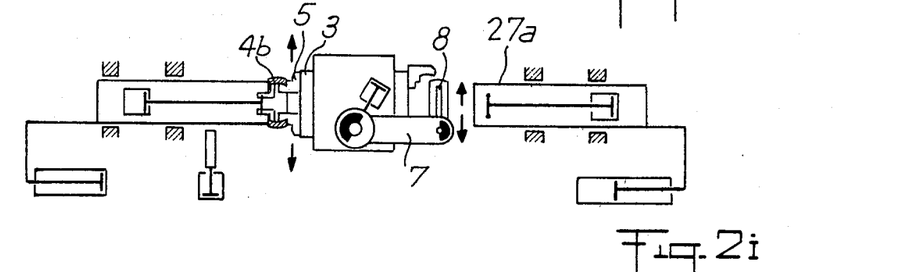

In FIG. 2i, the pressure of the clamp 8 is released and the clamping on the workpiece 4 is ensured only by the pressure exerted by the elastic members 22. Simultaneously, the jaws 5a of the chuck 3 are tightened in order to hold the workpiece 4b on the chuck.

Figure 2J:
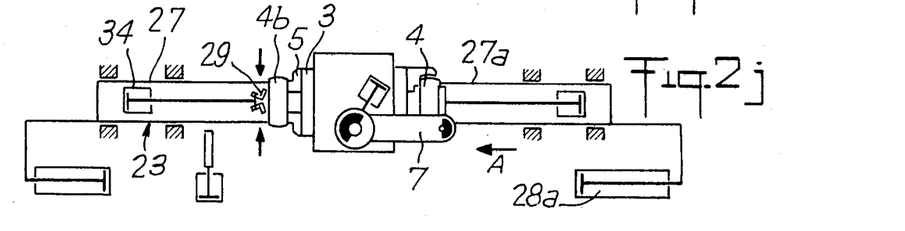

As shown in FIG. 2j, the tubular element 27a is moved in the direction of arrow A by means of a jack 28a in order to release the end of said element inside the workpiece 4. Moreover, the fingers 29 of the tubular element 27 of the injection member 23 are returned to a retracted position by means of the jack 34 to release the workpiece 4b mounted on the chuck 3.

Figure 2K:
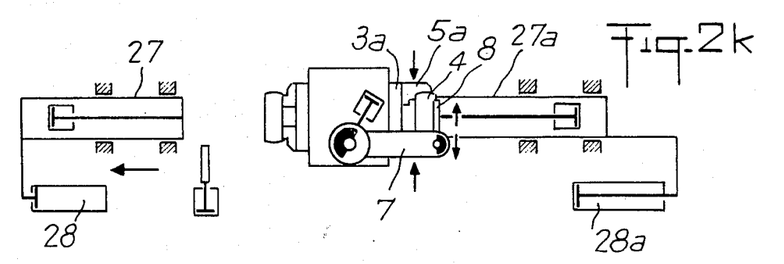
Figure 2L:
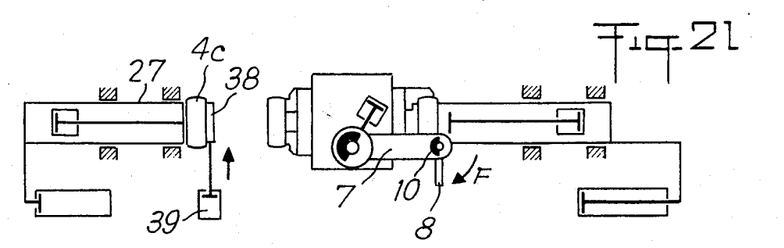

In FIG. 2k, the clamp 8 of the transfer arm 7 is open, and the workpiece 4 is held on the chuck 3a by the jaws 5a which are in the clamping position. Simultaneously, the jack 28 is actuated to return the tubular element 27 to its initial position on the left. In FIG. 2l a workpiece 4c is brought opposite the end of the tubular element 27 and the abutment 38, actuated by the jack 39, comes into abutment against the workpiece 4c. Moreover, the jack 10 of the arm 7 is actuated so as to pivot the clamp 8 in the direction of arrow F, and to return the clamp to its initial position to pick up a workpiece on the left.

Figure 2M:
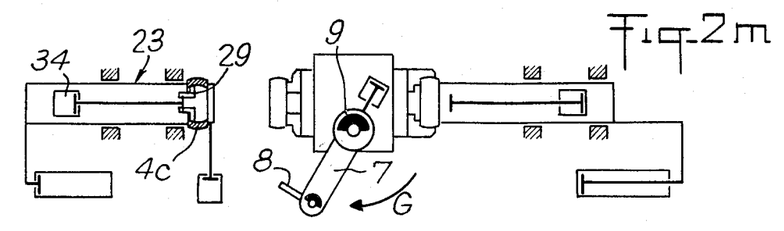

In FIG. 2m, the jack 9 is actuated to move the transfer arm 7 in the direction of arrow G and return the arm to the initial position illustrated in FIG. 2a. Simultaneously, the jack 34 of the injection member 23 is actuated to extend the fingers 29 and bring them in a clamping position inside the workpiece 4c.

Figure 2N:
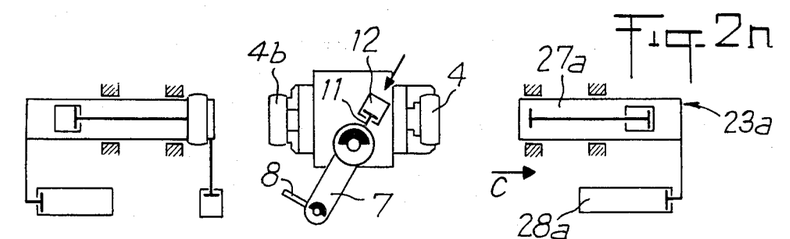

Finally, in FIG. 2n, the locking member 11 is actuated by the jack 12 to hold the transfer arm 7 in the locked position and the jack 28a is actuated to move the tubular element 27a of the ejection member in the direction of arrow C, and return it to its initial position.

When the device is in the position shown in FIG. 2n, the workpieces 4 and 4b are clamped in the chucks 3, 3a and can be machined.

Figure 7:
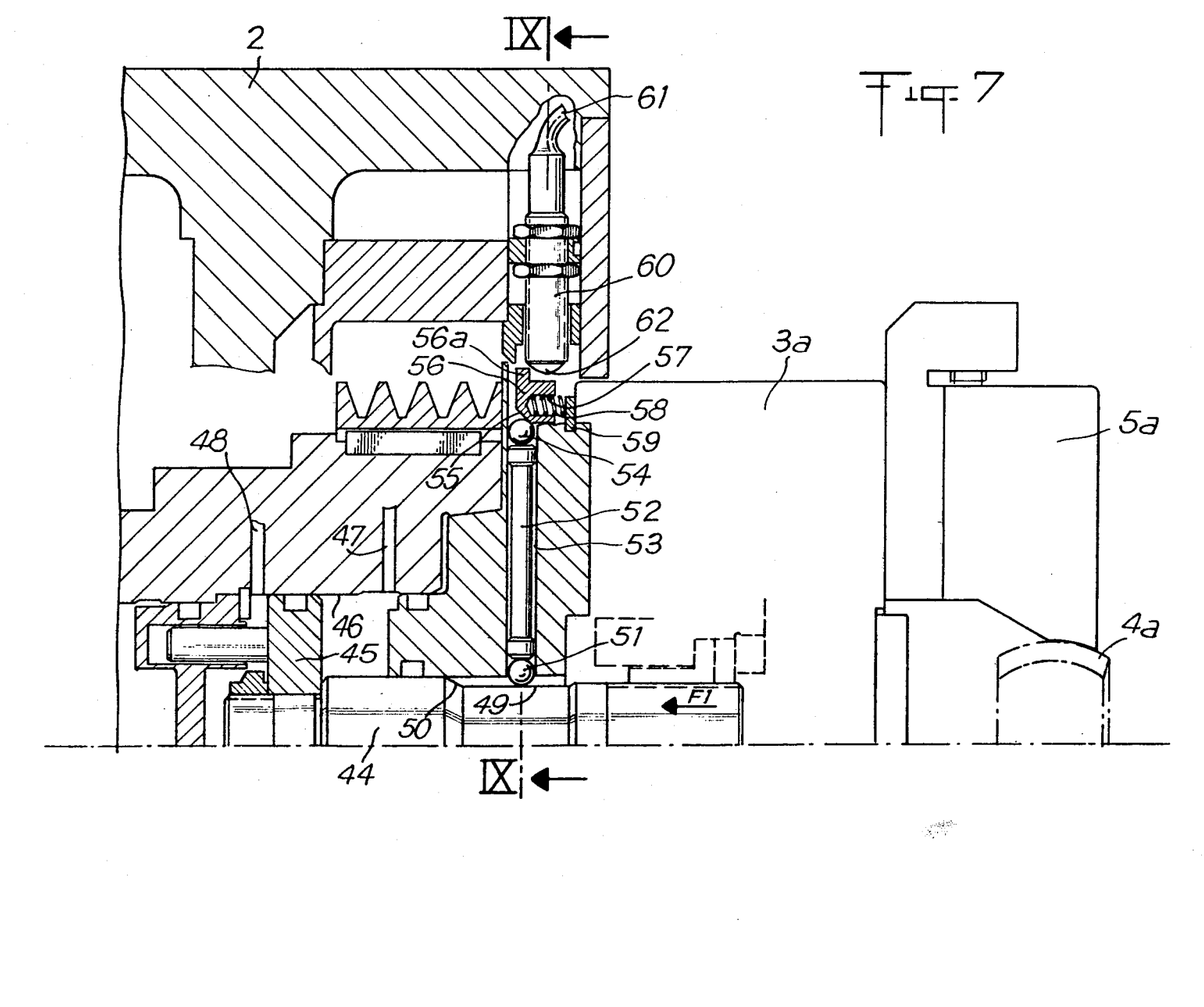
FIG. 7 is a half-view of an axial cross-section of the means provided for controlling the workpiece in the clamped position.
Figure 9:
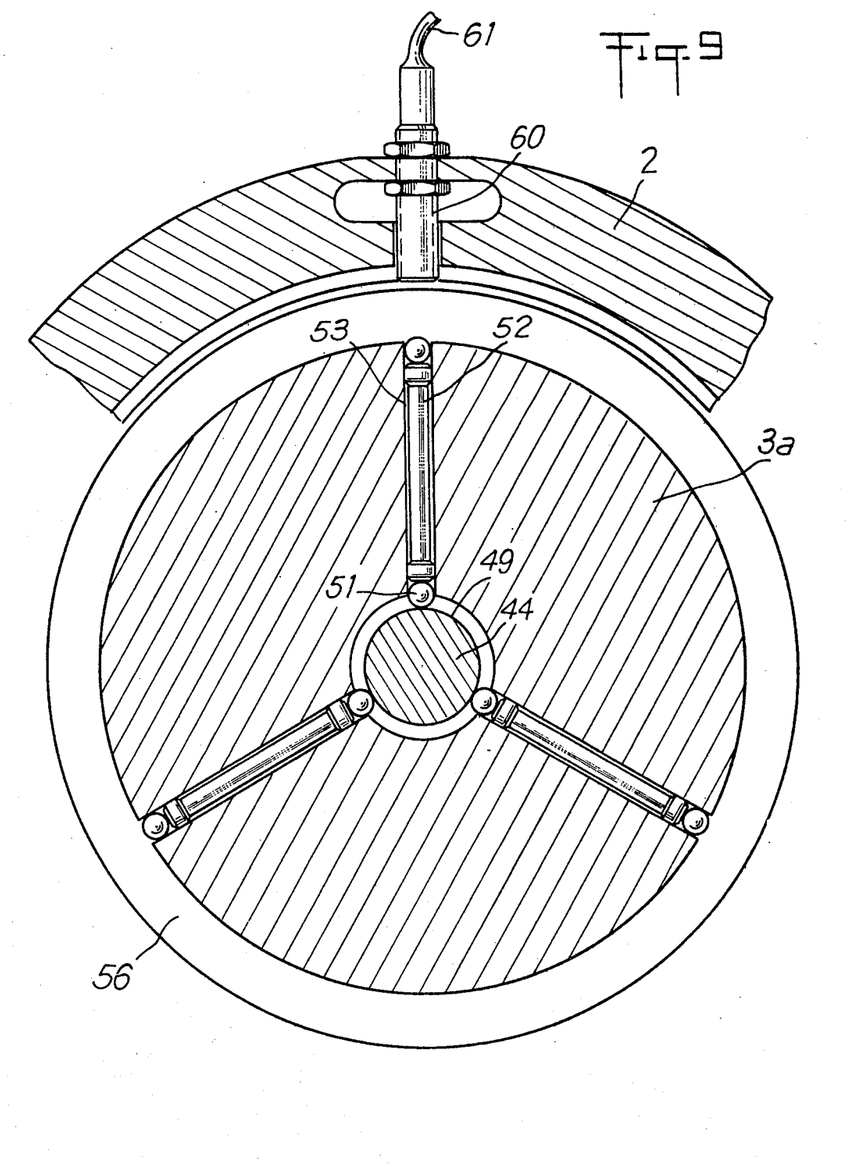
FIG. 9 is a cross-sectional view along the line IX—IX of FIG. 7.
Figure 11:
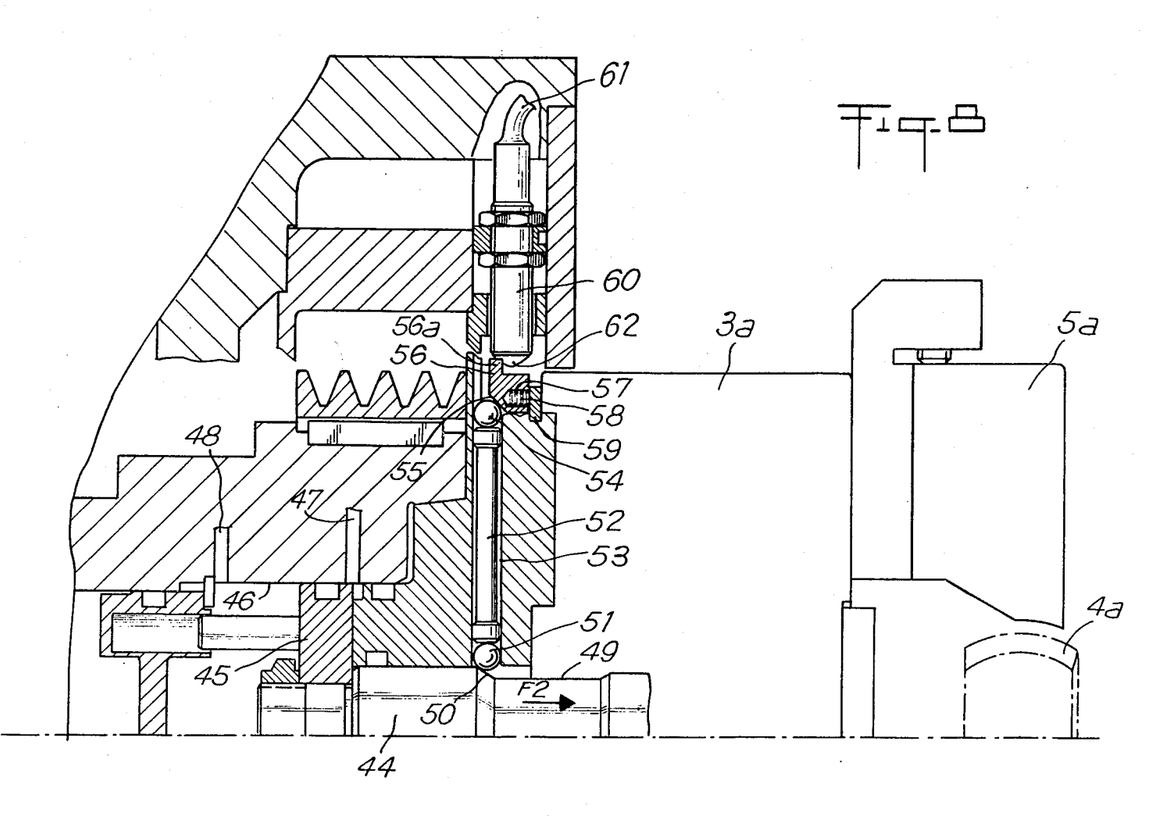

To determine the clamping and releasing positions of the jaws 5 and 5a of the chucks 3, 3a, in order to mount and dismount the workpieces, there is provided on each chuck 3, 3a a detection means which is shown in FIGS. 7, 8 and 9. The means controlling the jaws 5, 5a of the chuck 3, 3a is a rod 44 (only partly shown) which is connected to a piston 45 of a jack comprising a cylinder 46 into which two conduits of hydraulic fluid 47 and 48 issue on the two faces of said piston. The connection between the rod 44 and the jaws 5a is not shown in the drawing because it is of a well-known type.

The rod 44 includes a cylindrical portion 49 of small cross-section having on one side a truncated or inclined face 50, the portion 49 being in contact with three balls 51 resting against one end of three push rods 52, mounted for sliding in three bores provided in the rotary part of the chuck 3, 3a. At their other end, the push rods 52 rest via balls 54 against a face 55 inclined at 45° to a ring 56 provided on the side opposite the inclined face. The ring includes housings 57 into which extend springs 58 resting against a washer 59 integral with the chuck 3, 3a.

A flange 56a is provided on the ring 56, which flange moves in front of a magnetic field detector 60 connected by a conductor 61 to a sequential programming memory.

When the hydraulic fluid (FIGS. 7,9) is introduced into the cylinder 46 via the conduit 47, the piston 45 and the rod 44 are driven in the direction of arrow F1 thus tightening the jaws 5a on the workpiece 4a. In this position, the balls 51 are elastically held in contact with the cylindrical part 49 of the rod 44 under the action of the ring 56 which is pushed back by the springs 58 and transmits the pressure, via the balls 54, to the push rods 52 and to the balls 51. In this position, the flange 56a of the ring 56 is outside the magnetic field 62 of the detector 60 which is not excited and thus sends no information to the sequential programming memory. In order to release the workpiece 4a, the hydraulic fluid is introduced through the conduit 48, so that the piston 45 and the rod 44 are pushed back in the direction of arrow F2. The rod 44 actuates the device controlling the jaws 5, 5a which jaws open to release the workpiece. In this position, the balls 51 come into contact with the inclined face 50 of the rod 44 and push back the push rods 52 as well as the balls 54 towards the ring. The balls 54 which are in contact with the inclined face 55 of the ring exert a radial pressure which is converted into an axial pressure on the ring 56. As a result, the ring moves axially and the flange 56a penetrates into the magnetic field 62 of the detector 60. The detector sends a signal to the sequential programming memory whereby the workpiece is effectively loosened. The operations of in unloading the finished workpiece and loading a workpiece to be worked can thus start at the proper moment.

The invention is in no way limited to the description given hereinabove and on the contrary various modifications can be made therein without departing from its scope or its spirit.

What is claimed is:

1. A workpiece transfer apparatus for a lathe with a headstock having two clamping chucks mounted on opposite sides of the headstock for rotation about a common axis, the transfer apparatus comprising:
    transfer means pivotally mounted to the headstock for transferring a workpiece from one clamping chuck to the other clamping chuck; and
    injecting means disposed co-axially with said one clamping chuck for transferring a workpiece from a workpiece loading station into said one clamping chuck and ejecting means disposed co-axially with said other clamping chuck for transferring a workpiece from said other clamping chuck to a workpiece unloading station.

2. Apparatus as claimed in claim 1, wherein:
    said transfer means comprises a transfer arm of which one end is mounted for pivoting in a horizontal plane on the upper part of the headstock and a jack for pivoting said arm,
    said transfer arm is provided at its other end with a vertical axle driven in rotation relative to said arm by a jack and
    said axle carries at its lower end a clamping member for holding the workpiece.

3. Apparatus as claimed in claim 2, wherein said clamping member comprises two jaws each of which is integral with a shaft mounted for rotation on the end of the vertical axle of the transfer arm, each of which shafts carries a gear wheel actuated by a jack against the action of elastic members holding said jaws in the closed workpiece-clamping position.

4. Apparatus as claimed in claim 2, wherein the transfer arm is locked by a locking member in at least one position to allow the workpiece to be machined.

5. Apparatus as claimed in claim 1, wherein the injecting means and ejecting means each comprise composed of a support resting on the frame of the lathe and two bearings in which are slidably mounted for axial movement a tubular element actuated by a jack, said tubular element being provided at one of its ends with at least three pivotally mounted fingers for engaging a groove provided inside the workpiece, said fingers being actuated by a rod controlled by a jack inside said tubular element.

6. Apparatus as claimed in claim 5, wherein opposite said tubular element of said injecting means are provided the outlet orifice of a workpiece-supplying gullet and a retractable abutment against which can abut the workpiece mounted on the clamping fingers.

7. Apparatus as claimed in claim 5 wherein sideways from said ejecting means are provided a workpiece-abutment member and a workpiece-discharging gullet.

8. Apparatus as claimed in claim 1, wherein:
    each chuck comprises jaws and an axially movable rod for controlling said jaws,
    each said rod is provided with a groove with an inclined face in which is engaged at least one ball resting against one of the ends of at least one radial push rod, the other end of said radial push rod resting against another ball which cooperates with an inclined face of a ring subjected to the action of elastic members acting against the action of the ball, and
    said ring is provided with a flange which forms a magnetic screen moving against at least one magnetic field detection means connected with a sequential programming memory.

* * * * *